(12) United States Patent
Gobin et al.

(10) Patent No.: US 9,617,366 B1
(45) Date of Patent: *Apr. 11, 2017

(54) LOW-FLUORIDE, REACTIVE POLYISOBUTYLENE

(71) Applicant: TPC Group LLC, Houston, TX (US)

(72) Inventors: André M. Gobin, Pearland, TX (US); Rajeev Kumar, Houston, TX (US); Wayne Ouellette, Missouri City, TX (US); Michael O. Nutt, Pearland, TX (US); Leonard M. Czupski, League City, TX (US); Peggy J. Macatangay, League City, TX (US)

(73) Assignee: TPC GROUP LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/059,435

(22) Filed: Mar. 3, 2016

(51) Int. Cl.
  $C08F\ 2/00$  (2006.01)
  $C08F\ 4/00$  (2006.01)
  $C08F\ 210/00$  (2006.01)
  $C08F\ 210/12$  (2006.01)

(52) U.S. Cl.
  CPC ................... $C08F\ 210/12$ (2013.01)

(58) Field of Classification Search
  CPC ............. C08F 4/14; C08F 2/00; C08F 210/12
  USPC .......................... 526/64, 237, 348
  See application file for complete search history.

(56) References Cited

U.S. PATENT DOCUMENTS

| | | |
|---|---|---|
| 4,152,499 A | 5/1979 | Boerzel et al. |
| 4,605,808 A | 8/1986 | Samson |
| 5,068,490 A | 11/1991 | Eaton |
| 5,191,044 A | 3/1993 | Rath et al. |
| 5,286,823 A | 2/1994 | Rath et al. |
| 5,408,018 A | 4/1995 | Rath |
| 5,674,955 A | 10/1997 | Kerr et al. |
| 5,846,429 A | 12/1998 | Shimizu et al. |

(Continued)

OTHER PUBLICATIONS

J.P. Kennedy et al., Carbocationic Polymerization (1982), p. 229, John Wiley & Sons, New York.

*Primary Examiner* — William Cheung
(74) *Attorney, Agent, or Firm* — Michael W. Ferrell

(57) ABSTRACT

A method of making a low-fluoride reactive PIB composition includes in one embodiment: a) providing an isobutylene-enriched C4 feedstock by way of blending a first mixed C4 feedstock with a second feedstock having a lower LB/IsoB index; (b) feeding the isobutylene-enriched C4 feedstock to a polymerization reactor with a catalyst complex comprising $BF_3$ and a modifier selected from alcohols, ethers and mixtures thereof; (c) polymerizing the isobutylene-enriched C4 feedstock in the reactor while maintaining the reactor at a temperature above −40° C. and most preferably above −15° C. and utilizing a residence time less than 45 minutes to produce a crude PIB composition in a polymerization mixture; and (d) recovering a purified PIB composition from the polymerization mixture having a molecular weight, Mn, from 250 to 5000 Daltons and an alpha vinylidene content of at least 50 mol %. The crude PIB composition suitably has a fluoride content of less than 100 ppm and the purified PIB composition has a fluoride content of less than 20 ppm. In another aspect, ammonium salts are used to neutralize the catalyst and fluoride salts are sublimed from the product at elevated temperatures.

21 Claims, 3 Drawing Sheets

(56) References Cited

U.S. PATENT DOCUMENTS

| | | | |
|---|---|---|---|
| 5,962,604 A * | 10/1999 | Rath | ..................... C08F 110/10 526/237 |
| 6,300,444 B1 | 10/2001 | Tokumoto et al. | |
| 7,037,099 B2 | 5/2006 | Linke et al. | |
| 7,056,990 B2 | 6/2006 | Baxter, Jr. et al. | |
| 7,091,285 B2 | 8/2006 | Baxter, Jr. et al. | |
| 7,411,104 B2 | 8/2008 | Yun et al. | |
| 7,498,396 B2 | 3/2009 | Baxter, Jr. et al. | |
| 9,074,026 B2 | 7/2015 | Shaikh | |
| 2009/0023822 A1 | 1/2009 | Tijm | |
| 2010/0298507 A1 | 11/2010 | Menschig et al. | |
| 2015/0322181 A1 | 11/2015 | Kim et al. | |

* cited by examiner

LOW-FLUORIDE, REACTIVE POLYISOBUTYLENE

TECHNICAL FIELD

The present invention relates to the manufacture of reactive polyisobutylene (PIB) by way of cationic polymerization with a boron trifluoride catalyst characterized by elevated reaction temperatures and relatively short residence times having low residual fluorides. The process may be carried out in a loop reactor, a fixed bed reactor or a continuous stirred tank reactor (CSTR). In one embodiment, the process is carried out with a C4 feedstock such as raffinate or dehydrogenation effluent upgraded to higher relative isobutylene levels by blending with a second feedstock. In another embodiment, ammonium salts are used to neutralize the catalyst and fluoride salts are sublimed from the product at elevated temperatures.

BACKGROUND OF INVENTION

High vinylidene, or highly reactive PIB is characterized by a large percentage of terminal double bonds, preferentially greater than 70% or 80%. This provides a more reactive product, compared to regular or conventional PIB, and hence this product is also referred to as highly reactive PIB. The terms reactive or highly reactive (HR-PIB) and high vinylidene (HV-PIB) are synonymous. The basic processes for producing HR-PIB all include a reactor system, employing $BF_3$ catalysts with one or more catalyst modifiers. Since formation of the terminal double bond is kinetically favored, short reactions times favor high vinylidene levels. The reaction is typically quenched, usually with an aqueous base solution, such as, for example, NaOH or $NH_4OH$, before significant isomerization to internal double bonds can take place. Molecular weights are relatively low. HR—PIB having an average molecular weight of about 950-1050 is the most common product. Conversions, based on isobutylene, are kept at 75-85%, since attempting to drive the reaction to higher conversions reduces the vinylidene content through isomerization. Prior U.S. Pat. No. 4,152,499 dated May 1, 1979, prior U.S. Pat. No. 4,605,808 dated Aug. 12, 1986, prior U.S. Pat. No. 5,068,490 dated Nov. 26, 1991, prior U.S. Pat. No. 5,191,044 dated Mar. 2, 1993, prior U.S. Pat. No. 5,286,823 dated Jun. 22, 1992, prior U.S. Pat. No. 5,408,018 dated Apr. 18, 1995 and prior U.S. Pat. No. 5,962,604 dated Oct. 5, 1999 are all directed to related subject matter.

Other than the HR grades and the regular or conventional grades of PIB, a certain grade of PIB known as the enhanced grade was more recently developed. The advantage of these series of products is that the overall reactivity is high without the need for higher vinylidene content. The following patents describe enhanced or mid-range vinylidene content polyisobutylene (PIB) polymers and processes for producing them: U.S. Pat. Nos. 7,037,099; 7,091,285; 7,056,990; and 7,498,396. The products are characterized in that at least about 90% of the PIB molecules present in the product comprise alpha or beta position isomers. The vinylidene (alpha) isomer content of the product may range from 20% to 70% thereof and the content of tetra-substituted internal double bonds is very low, preferably less than about 10% or 5% and ideally less than about 1-2%. The midrange vinylidene content PIB polymer products are typically prepared by a liquid phase polymerization process conducted in a loop reactor at a temperature of at least 60° F. using a BF3/alcohol catalyst system.

U.S. Pat. No. 9,074,026 to Shaikh discloses a method of making reactive PIB in a loop reactor with low solvent levels using a $BF_3$ alcohol catalyst system.

United States Patent Application Publication No. US2010/0298507 of Menshig et al. relates to manipulating isobutene solvent levels in a loop reactor to influence PIB polydispersity and vinylidene content. See Tables 3, 4 on page 5.

U.S. Pat. No. 7,411,104 to Yun et al. discloses a process for making HR PIB with C4 raffinate using $BF_3$ catalyst complexed with tertiary butyl alcohol and diisopropyl ether. Reaction temperatures are below 0° C. and residence times range from 15 to 90 minutes. See Examples 1-9; note Table 2, Col. 9. The reactor appears to be a CSTR.

United States Patent Application Publication No. US2009/0023822 discloses PIB polymerization using raffinate feed wherein oxygenates are removed from the feed prior to polymerization. Polymerizations are carried out well below 0° C.

A continuing problem in the industry, especially with feedstocks that contain relatively high levels of n-butenes and butadienes such as raffinate is the persistance of fluorides in the product, especially organic fluorides. Fluorides cause numerous problems in the plant and in the product. For one, fluorides cause corrosion in a manufacturing plant, in both the aqueous and organic phases as the material is washed and worked up by purification. It is also a potential wastewater problem, depending on plant effluent standards. So also, remaining fluoride in the product is undesirable as well it may cause corrosion problems when making derivatives such as alkyl phenols or anhydrides and may be unacceptable to customers making derivatives.

Known methods of reducing residual fluorides in products based on raffinate feed are relatively complex and only marginally effective.

U.S. Pat. No. 6,300,444 to Tokumoto et al. discloses a process for making reactive PIB with residence times of from 5 minutes to 4 hours with a $BF_3$/ether-alcohol catalyst system followed by distillation. Fluoride levels are reported to be below 30 ppm. While a range of reactor temperatures are discussed, the examples are carried out at −10° C. It is also noted that even after repeated distillation, 6 ppm organic fluoride remains in the polymer. See Table 1, column 9

U.S. Pat. No. 5,674,955 to Kerr et al. discloses a method of making PIB from raffinate by pre-treating the raffinate to reduce 1-butene and increase 2-butene. The polymerization reaction is carried out at low temperature. The pre-treatment procedure includes isomerization and is reported to reduce residual fluorides in the final product. Organic fluorides reported in the products prepared from the modified raffinate streams (batches 3, 6, 9) are reported to be above 15 ppm.

United States Patent Application Publication No. 2015/0322181 teaches to treat cracked naptha raffinate containing isobutene through hydrogenation of the butadiene, followed by isomerization of B1 to B2 isomers followed by distillation to remove linear butenes. Even after the lengthy pre-treatment, fluoride levels in the purified product remain at 3 ppm and higher.

U.S. Pat. No. 5,846,429 to Shimizu et al. discloses a method of removing $BF_3$ from a liquid mixture by filtering with a polymer fiber having nitrile groups.

SUMMARY OF INVENTION

This invention provides a multi-pronged approach to reducing total fluorides in a reactive PIB product by addressing specific causes throughout the production/purification process. Reduction of fluorides arising from a feed composition is first addressed. In this aspect, the invention is directed to reducing organic fluorides formed in the reaction section by upgrading the feed to higher isobutylene content through blending. A second aspect of the invention is to further reduce formation of organic fluorides by optimizing the reaction conditions with the feed composition, typically by utilizing reactor temperatures and reactor residence times which lessen organic fluoride formation. In still another aspect of the invention, neutralization and removal of $BF_3$ as an inorganic salt from the reaction mixture is an important. In this case a specific family of ammonium salts formed is advantageous and is a third aspect to overall fluoride reduction in the product. Finally, a fourth aspect to low fluoride residue in the product occurs through optimization of downstream processing for the removal of components typically associated for adjusting the PIB oligomer product. In this aspect the specific conditions used in downstream equipment is to allow most effective removal of organic fluorides in the form of lower oligomeric fluoride residues, as well as, residual inorganic fluorides which moved over beyond the wash/neutralization section as a result of process rate increases or sub-optimal wash/separation systems.

A first aspect of the invention is thus directed to a method of making a low-fluoride reactive PIB composition which includes: (a) providing an isobutylene-enriched C4 feedstock by way of blending a first mixed C4 feedstock with a second feedstock having a lower LB/IsoB index; (b) feeding the isobutylene-enriched C4 feedstock to a polymerization reactor with a catalyst complex comprising $BF_3$ and a modifier selected from alcohols, ethers and mixtures thereof; (c) polymerizing the isobutylene-enriched C4 feedstock in the reactor while maintaining the reactor at a temperature above −40° C. and most preferably above −15° C. and utilizing a residence time less than 45 minutes to produce a crude PIB composition in a polymerization mixture; and (d) recovering a purified PIB composition from the polymerization mixture having a molecular weight, Mn, from 250 to 5000 Daltons and an alpha vinylidene content of at least 50 mol %.

Typically, the crude PIB product has a residual fluoride content of less than 200 ppm and the purified PIB product has a residual fluoride content of less than 50 ppm.

Another aspect of the invention includes a method of making a low-fluoride reactive PIB composition comprising: (a) providing an isobutylene-containing feedstock; (b) feeding the isobutylene-containing feedstock to a polymerization reactor with a catalyst complex comprising $BF_3$ and a modifier selected from alcohols, ethers and mixtures thereof; (c) polymerizing the isobutylene-enriched C4 feedstock in the reactor while maintaining the reactor at a temperature above −40° C. and utilizing a residence time less than 45 minutes to produce a crude PIB composition in a polymerization mixture; (d) withdrawing the crude PIB composition from the reactor; (e) neutralizing the crude PIB composition with an ammonium salt; (0 treating the crude PIB composition at a temperature of from 150° C. to 300° C. to separate oligomers from the crude PIB composition; and (g) recovering a purified PIB composition from the polymerization mixture having a molecular weight, Mn, from 250 to 5000 Daltons, and an alpha vinylidene content of at least 50 mol %.

Still further features and advantages of the invention will become apparent from the discussion which follows.

BRIEF DESCRIPTION OF DRAWINGS

The invention is described in detail below with reference to the various Figures, wherein.

DETAILED DESCRIPTION OF INVENTION

Figure 1:
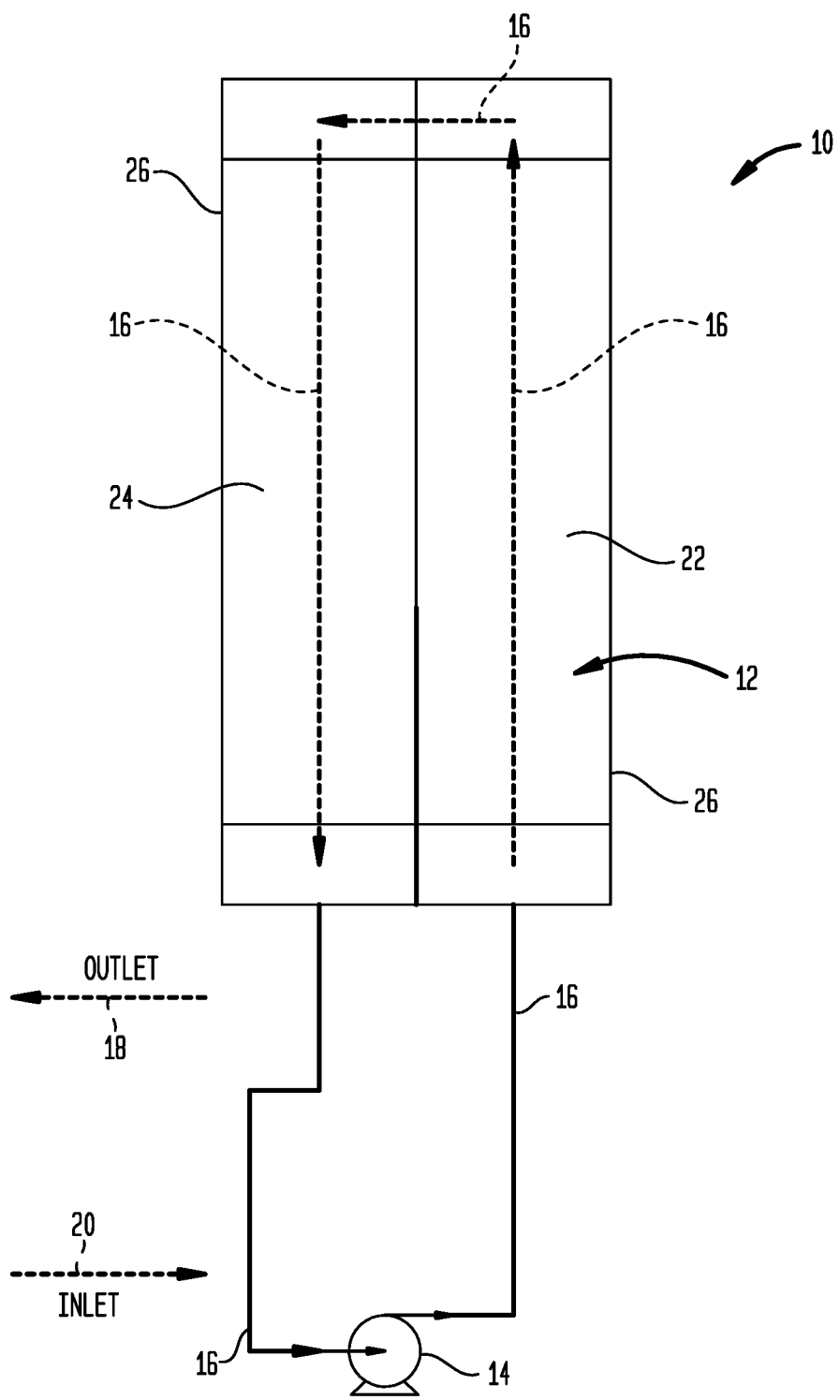
FIG. 1 is a schematic diagram illustrating a loop reactor apparatus suitable for use in connection with the present invention.

The invention is described in detail below with reference to several embodiments and numerous examples. Such discussion is for purposes of illustration only. Modifications to examples within the spirit and scope of the present invention, set forth in the appended claims, will be readily apparent to one of skill in the art. Terminology used throughout the specification and claims herein is given its ordinary meaning, for example, psi refers to pressure in lbs/inch$^2$ and so forth. Terminology is further defined below.

"Blending" and like terminology refers to intimate mixing of two or more feedstocks and includes simultaneously feeding two feedstocks to a reactor (in situ combination).

"Catalyst turnover number" and like terminology refers to the weight of polymer produced per unit weight of $BF_3$ catalyst employed in the process.

"Consisting essentially of" and like terminology refers to the recited components and excludes other ingredients which would substantially change the basic and novel characteristics of the mixture or composition. Unless otherwise indicated or readily apparent, a composition or mixture consists essentially of the recited components when the composition or mixture includes 95% or more by weight of the recited components. That is, the terminology excludes more than 5% unreacted components.

Conversion of the reaction mixture to polymer is expressed in weight percent and calculated as the weight of polymer produced less the weight of isobutylene fed to the reaction system divided by the weight of isobutylene fed to the reaction system times 100%.

Crude PIB product and like terminology means PIB as recovered from the reaction mixture, by washing the crude product to remove highly water-soluble salts, and by evaporating unreacted monomer, catalyst modifier, solvent and the like but otherwise not purifying the product by distillation to promote high purity. A crude PIB product is suitably one after initial work-up where at least 95% by weight of monomer and solvent from the reactor effluent is removed and at least 75% by weight of the water soluble fluoride salts have been removed. This may be achieved by using the wash process disclosed in U.S. Pat. No. 6,858,188. The crude PIB is then analyzed for fluorides as noted below and is compared with the reactor effluent to verify soluble salt removal. The crude PIB is also compared with reactor effluent to verify solvent and monomer removal.

Purified PIB and like terminology refers to PIB product recovered from the reaction mixture by washing the reactor effluent with water to remove salts and flashing to remove unreactive monomer, catalyst modifier solvent and the like, including distillation at elevated temperature to substantially remove all oligomers. The purified PIB is then analyzed for fluorides as noted below.

As used herein, "diluents", like terminology refers to solvent components unreactive under reaction conditions and includes aliphatic hydrocarbon compounds such as butane, propane, hexane and so forth, specifically, for example, I-butane, n-butane, n-hexane and hexane isomers, as well as mixtures thereof. Diluents also include relatively unreactive alkenes such as 1-butenes and the like which are present in the reaction mixture but do not polymerize under reaction conditions.

Residual fluoride (or total) content of a product is reported in ppm fluorine by weight of the composition and is determined by combustion/ion chromatography in accordance with test method ASTM D 7359 entitled "Standard Test Method for Total Fluorine, Chlorine and Sulfur in Aromatic Hydrocarbons and Their Mixtures by Oxidative Pyrohydrolytic Combustion followed by Ion Chromatography Detection (Combustion Ion Chromatography-CIC)".

Residual inorganic fluoride and residual organic fluoride are reported in ppm F by weight of the composition and is determined as by washing a sample of product to remove fluoride salts and measuring the total fluoride content before and after washing as noted above. Results are confirmed measuring the amount of fluorine in the wash water and mass balance. A known amount of polymer, typically 10 grams is diluted in 100 ml of hexanes in a glass bottle. Once it formed a homogenous mixture in hexane, 20 ml of ethyl alcohol and 100 ml of water is added into the mixture. This solution is heated to 80° C. for 20 minutes and then vortexed for 10 minutes. After vortexing the whole mixture is poured in a separating funnel. The bottom layer which is a mixture of water and ethyl alcohol is transferred in a beaker and used for measurement of fluorine content using a fluoride ion probe or ASTM D7359 standard test method. The remaining organic content was washed 5-7 times in excess of water. After washing, the organic layer the hexanes were evaporated under reduced pressure in Rotavap. After all the hexanes were evaporated, PIB was collected in a vial and sent for total fluoride measurement by CIC (ASTM D7359). Total fluoride content in PIB samples before wash and after wash were recorded. Results are confirmed by mass balance on fluorine content of the water/alcohol mixture.

Residual inorganic fluorides present are inorganic salts typically those arising from quenching the $BF_3$ catalyst. These species are relatively easy to extract with water and/or alcohol as seen in the procedure above.

Residual organic fluorides are compounds which contain a carbon-fluorine bond and are likely to arise from incorporation of fluorine with active species in the reaction mixture. These species may be most prevalent as adducts fluorinated at tertiary carbons in the oligomer product. The contaminants are insoluble in water and thus difficult to remove after the product is synthesized. Thus, in preferred embodiments of the invention, the purified product contains less than 50 ppm by weight fluorine in the product corresponding to fluorinated compounds of the formula:

$R_1$ and $R_2$ = $C_n H_{2n+1}$
where n = 0 to 50
$R_3$ = H or ——$CH_3$

Unless otherwise specified, molecular weight herein is reported as number average molecular weight, $M_n$, in Daltons, and is measured by gel permeation chromatography (GPC). GPC measurements may be carried out using a Viscotek GPCmax® instrument (Malvern instruments, Worcestershire, UK) employing a 3-column set-up (5 μm (particle size) 100 Angstrom (pore size), 5 μm 500 Angstrom, 5 μm $10^4$ Angstrom) and a Refractive Index (RI) detector. Polyisobutylene standards are used to construct the calibration curve using this technique.

Percent, percent, % or like terminology refers to mole percent unless otherwise indicated.

Polydispersity or PDI is defined as the ratio of the weight average molecular weight divided by the number average molecular weight of the polymer.

Residence time is calculated as the volume of the reactor divided by the volumetric feed rate at steady state.

Polyisobutylene, "PIB" and like terminology refers to polymers made up of repeat units derived from isobutene, also referred to as isobutylene.

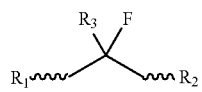

Such polymers are derived from feedstocks made up of purified isobutenes and hydrocarbon diluents, from isobutene concentrate, dehydro effluent, or from raffinate streams. The PIB polymer consists essentially of repeat units derived from isobutylene, but may contain minor amounts of material derived from 1-butenes, butadiene or other $C_4$ olefins, 2-butenes (cis and/or trans) depending on the feedstock composition. Typically, the polymer is more than 99% by weight derived from isobutylene monomer. Particular compositions of interest in connection with the present invention have a number average molecular weight of from 500 to 4000 Daltons and in preferred embodiment's significant amounts of alpha vinylidene terminated molecules:

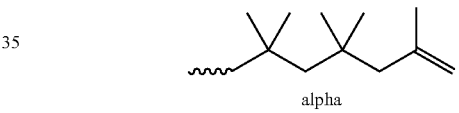

alpha

Highly reactive (HR) PIB polymer compositions typically include more than 75 or 80 mole % alpha molecules, while mid-range vinylidene content PIB products contain less alpha and more beta olefin isomers (1,1,2-trisubstituted or 1,2,2-trisubstituted cis or trans isomer):

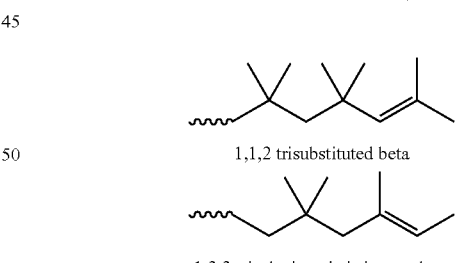

1,1,2 trisubstituted beta 1,2,2 trisubstituted cis isomer beta

Optionally present are internal vinylidene isomers (disubstituted internal vinylidene isomers) which also have relatively high reactivity, for example:

Other structures which may be present include tetrasubsituted structures, other trisubstituted structures with a double bond in the internal gamma position, structures with other internal double bonds and aliphatic structures, for example:

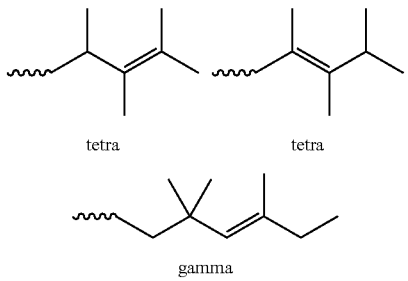

tetra    tetra gamma

When calculating endgroup percentages, all PIB molecules found in the PIB compositions having a significant presence (more than half a percent or so) are included in endgroup calculations. The endgroup content is determined by nuclear magnetic resonance $^{13}C$ NMR as is well known in the art.

The linear alkene/isobutylene index or LB/IsoB index of a feedstock is calculated as the weight percentage of linear butenes and butadienes based on the combined weight of linear butenes, C4 dienes and isobutylene in a particular composition. For the isobutylene concentrate in Table 1 the LB/IsoB index is calculated as (1.3+0.8+0.4+0.2)/(89+1.3+0.8+0.4+0.2)*100%=2.9%.

TABLE 1

Isobutylene Concentrate

| Ingredient | Weight % |
| --- | --- |
| C$_3$ component | 0.00 |
| I-butane | 6.5 |
| n-butane | 1.7 |
| 1-butene | 1.3 |
| Isobutene | 89 |
| trans-2-butene | 0.8 |
| cis-2-butene | 0.4 |
| 1,3-butadiene | 0.2 |

LB/IsoB Index: 2.9%

High purity isobutylene, has a still lower LB/IsoB index, about 0.30% max as is seen from the following Table 2:

TABLE 2

High Purity Isobutylene

| Ingredient | Value |
| --- | --- |
| Isobutene | >99.8 |
| 1-Butene plus cis-2-butene and trans-2-butene | <0.15 |
| 1,3-Butadiene | <0.10 |
| Butane | <0.15 |
| C$_3$ components | <0.10 |

Max LB/IsoB index: ~0.30%

Mixed C4 feedstock compositions are reported in Tables 3, 4:

TABLE 3

Dehydro Effluent

| Ingredient | Weight % |
| --- | --- |
| C$_3$ components | 0.4 |
| I-butane | 43 |
| n-butane | 1.3 |
| 1-butene | 0.80 |
| Isobutene | 52.5 |
| trans-2-butene | 1 |
| cis-2-butene | 0.7 |
| 1,3-butadiene | 0.20 |

LB/IsoB index: 4.9%

TABLE 4

Raff-1

| Ingredient | Weight % |
| --- | --- |
| C$_3$ components | 0.4 |
| I-butane | 4.5 |
| n-butane | 16 |
| 1-butene | 37 |
| Isobutene | 30 |
| trans-2-butene | 8.5 |
| cis-2-butene | 2.3 |
| 1,3-butadiene | 0.4 |
| Other | 0.6 |

LB/IsoB index: 61.9%

For a discussion of mixed C4 feedstocks, see U.S. Pat. No. 9,034,998 to Faust et al., Col. 4, lines 14 and following. As referred to herein, isobutylene concentrate is a C4 composition with 80% by weight or more isobutylene and high purity isobutylene contains more than 98% by weight isobutylene. Dehydro effluent and raffinate refer to compositions having the components substantially as seen in Tables 3 and 4, wherein the various components may be +/−40% by weight based on the weight of that component.

The PIB polymer of the invention consists essentially of repeat units derived from isobutylene, but may contain minor amounts of material derived from 1-butenes, butadiene or other C$_4$ olefins, 2-butenes (cis and/or trans) depending on the feedstock composition. Preferably, the polymer is more than 99% by weight derived from isobutylene monomer. Optionally, the use of a Chain transfer Agent (CTA) facilitates the production of low molecular weight, highly reactive PIB in the polymerization reaction. Suitable CTAs are known in literature. Note WO 2012/170411, citing as well as J. P. Kennedy et al, *Carbocationic Polymerization* (1982), page 229, John Wiley & Sons, New York which lists several chain transfer agents and their transfer coefficients. A suitable CTA for use in connection with the present invention is selected from the group consisting of 2,4,4-Trimethyl-1-pentene ("α-DIB"), 2,4,4-Trimethyl-2-pentene ("β-DIB"), 2-ethyl-1-hexene, 2-methyl-1-pentene and mixtures thereof. Of these, α-DIB, β-DIB, or mixtures thereof are preferred. The structures of α-DIB and β-DIB are shown below:

2,4,4-trimethylpent-1-ene
(α-DIB)

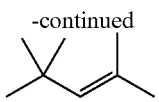

2,4,4-trimethylpent-2-ene
(β-DIB)

The feedstock is optionally purified to remove water and oxygenates such as alcohols, ethers and so forth to avoid adverse effects on the catalyst. Typical media for removal of impurities from hydrocarbon feed streams use molecular sieves, activated alumina and other hybrid adsorbents in the form of an absorber bed. Suitable adsorbents include Aluminum oxides, aluminum halides, calcium oxides, zirconium oxides, titanium oxides, silicates, aluminosilicates, zeolites or mixtures thereof. Post treatment, prior to feeding to the reactor, the feed stream preferably has less than 3 ppm of oxygenates and less than 1 ppm of water.

The catalyst employed is a $BF_3$ catalyst together with a modifier, sometimes referred to as a cocatalyst or complexing agent. The modifier for the $BF_3$ catalyst may be any compound containing a lone pair of electrons, such as, for example, an alcohol, ether, an ester or an amine or mixtures thereof. The alcohol compound used as the cocatalyst may be a primary, secondary or tertiary alcohol having 1 to 8 carbon atoms, such as, for example, methanol, ethanol, isopropanol, n-propanol, isobutanol, t-butanol, hexyl alcohol and the like. The ether compound used as the cocatalyst may be a primary, secondary or tertiary ether having 2 to 8 carbon atoms, such as, for example, dimethyl ether, diethyl ether, diisopropyl ether, methylpropyl ether, methylisopropyl ether, methylethyl ether, methylbutyl ether, methyl-t-butyl ether, ethylpropyl ether, ethylisopropyl ether, ethylbutyl ether, ethylisobutyl ether, ethyl-t-butyl ether and the like. In forming a complex of the cocatalyst and boron trifluoride, the cocatalyst alone or in combination with at least one of other cocatalysts is added into a tank, and a boron trifluoride gas is then provided to produce a complex.

In one embodiment, the polymerization reaction is carried out in the presence of a catalyst system comprising secondary alkylether, tertiary alcohol, and boron trifluoride, the amount of boron trifluoride is 0.05-1.0 weight part per 100 weight part of isobutylene, the mole ratio of a co-catalyst including secondary alkylether and tertiary alcohol:boron trifluoride is 1.0-2.0:1, and the mole ratio of secondary alkylether:tertiary alcohol is 0.5-1.2:1.

In many embodiments, the molar ratio of modifier to $BF_3$ in the catalyst composition is generally in the range of from approximately 0.5-3.5 to 1, desirably within the range of from approximately 0.5:1 to approximately 2:1, and in some cases within the range of from approximately 1.5:1 to approximately 1:1. In some cases, the catalyst composition may simply be a 1:1 molar complex of $BF_3$ and alcohol and ether mixtures. In other preferred embodiments of the invention, the molar ratio of complexing agent:$BF_3$ in said complex may be approximately 1.3:1.

The temperature in the reaction zone may preferably be maintained at a constant level at a temperature of −25° C. or above; more typically −10° C. or above or wherein the reactor is maintained at a temperature of 0° C. or above. Temperatures in the range of above −20° C. to 40° C. are typical. The residence time is most preferably 45 minutes or less, such as 20 minutes or less, 15 minutes or less or 10 minutes or less. Suitable pressures may be anywhere from 2-20 bar to maintain a liquid phase.

In some embodiments, it is desirable to use one or more inert diluents such as an alkane (e.g., isobutane, n-butane, hexane and the like) are used.

The products of the invention may be made in a loop reactor in a liquid phase process.

The flow characteristics of the reaction mixture are also influenced by temperature in the reactor, molecular weight, monomer and diluent content and so forth as is readily appreciated by one of skill in the art. The flow characteristics of the reaction mixture are thus controlled by feed and catalyst rates, conversion of monomer, mixture composition and the temperatures in the reactor as is seen in the examples which follow.

Typically, the inventive process is operated in a loop reactor wherein the recirculation rate is much higher than the feed rate ratios of recirculation to feed ratios may be anywhere from 5:1 to 40:1.

Referring to FIG. 1, there is shown schematically a reactor system 10 which includes a two-pass loop reactor 12, a recirculation pump 14, a feed and recirculation loop indicated at 16, a product outlet indicated at 18 and a feed inlet indicated at 20. Reactor 12 includes a plurality of reaction tubes indicated at 22, 24 in a two-pass configuration within a heat exchanger shell indicated at 26.

In operation, isobutylene feedstock, catalyst and modifier is continuously fed at 20 to the system, while pump 14 operates at a pressure differential to recirculate the reaction mixture in reactor 12 via loop 16, while product is continuously withdrawn at 18. Details of operating reactor 12 are provided in EP 1,242,464.

Instead of a homogeneous catalyst feed, a fixed bed loop reactor having generally the construction of FIG. 1 with heterogeneous catalyst packed in the tubes of described heat exchanger. In such cases, a supported $BF_3$:alcohol catalyst is charged to the system as is seen in U.S. Pat. No. 8,791,216, entitled Activated Inorganic Metal Oxide and U.S. Pat. No. 8,816,028, entitled Polyisobutylene Composition Having Internal Vinylidene and Process for Preparing the Polyisobutylene Polymer Composition. Optionally, additional liquid catalyst complex is injected into the system to replenish the catalyst charge.

Figure 2:
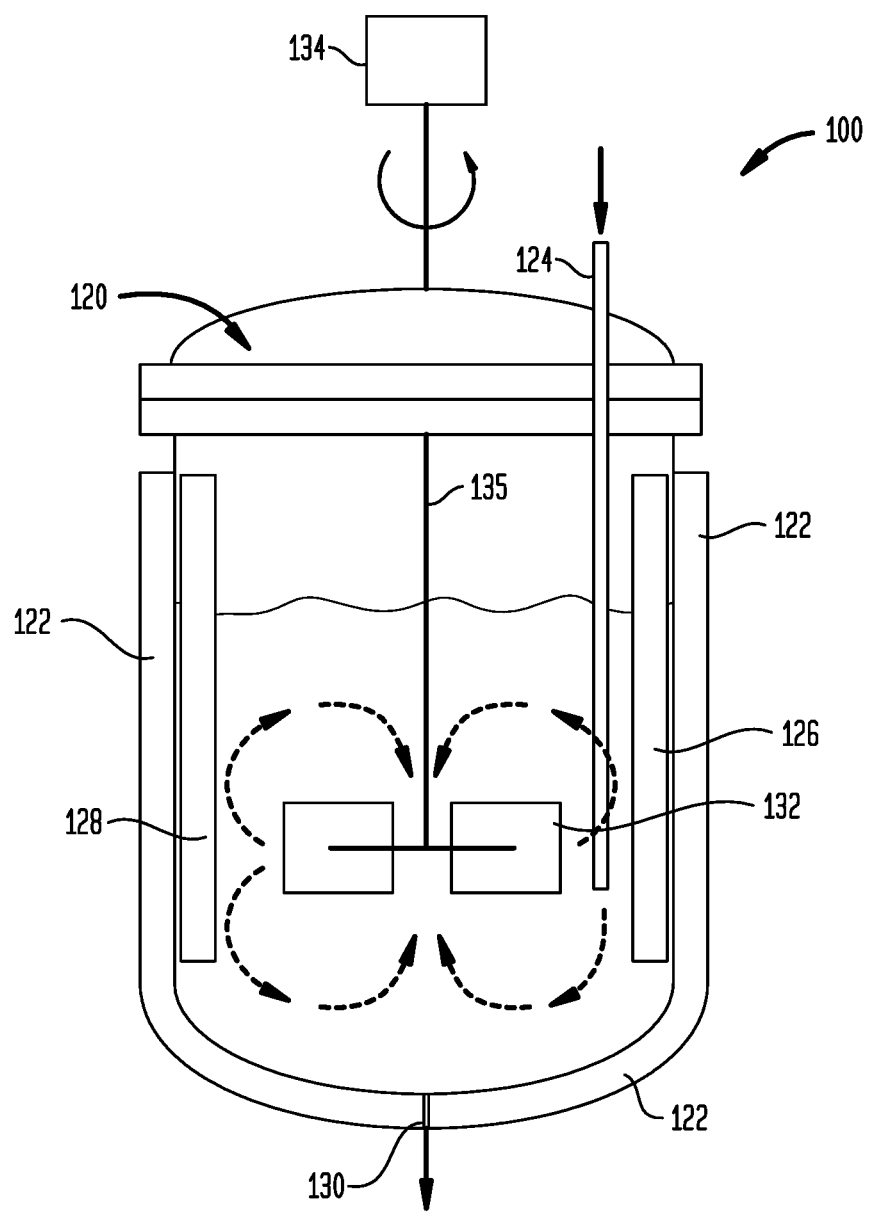
FIG. 2 is a schematic diagram illustrating a CSTR suitable for use in connection with the present invention.

In still another embodiment, the present invention is practiced in a CSTR, as shown schematically in FIG. 2. CSTR apparatus 100 includes a pressurized reaction vessel 120 provided with a cooling jacket 122, a feed port 124, one or more baffles 126, 128, an outlet port 130, as well as an agitator 132, driven by a motor 134 via shaft 135.

In operation, the isobutylene feedstock, together with catalyst and modifier, is fed continuously to vessel 120 in the liquid phase through feed port 124, while motor 134 drives agitator 132 via shaft 135 to keep the reaction mixture thoroughly mixed. The feed rate, cooling jacket temperature and catalyst concentration are manipulated to keep the reactor at the desired temperature and to achieve target conversion as product is continuously withdrawn from outlet port 130 after a characteristic steady state residence time in the reactor.

The residence time, feed composition and temperature in all cases are important features towards achieving low fluoride. Preferably, at least a relatively high temperature and/or a short residence time is employed.

Catalyst productivity (efficiency) is remarkably improved at higher temperatures and lower residence times as compared to prior art systems with lower reaction temperatures and longer residence times. In Table 5, high temperature/low residence time processes as described in WO2013/062758 are compared with selected prior art reaction systems.

TABLE 5

Comparison of Catalyst Productivity

| Source | Ex. | TON - $BF_3$ lbs polymer/ lbs $BF_3$ | Mn Daltons |
|---|---|---|---|
| WO2013/062758 | 35 | 2896.61 | 3118 |
| WO2013/062758 | 46 | 3028.36 | 3560 |
| WO2013/062758 | 16 | 1476.1 | 1087 |
| WO2013/062758 | 23 | 1153.9 | 2419 |
| U.S. Pat. No. | | | |
| 7,038,008 | 1 | 888.07 | 2387 |
| 7,038,008 | 2 | 318.45 | 956 |
| 7,217,773 | comp | 321.21 | 980 |
| 7,217,773 | 1 | 405.06 | 930 |
| 7,485,764 | 1 | 407.52 | 1150 |
| 7,485,764 | 2 | 407.52 | 1070 |
| 7,485,764 | 3 | 407.52 | 1030 |

Following withdrawal from the reactor, the reaction mixture is quenched to deactivate the catalyst, preferably with an inorganic base such as sodium hydroxide or ammonium containing catalyst deactivator such as ammonium hydroxide. The effluent is then washed with water to remove salts as described in U.S. Pat. No. 6,858,188. Following washing, the processed effluent is flashed or distilled to remove oligomers in order to provide a purified product as is discussed herein.

Salts may be carried downstream from a washing vessel. Thus, the use of an ammonium catalyst deactivator is particularly preferred since ammonium salts such as ammonium tetrafluoroborate sublime at elevated temperatures. Preferred ammonium quenching agents may include a variety of ammonium salts such as ammonium carbonate, ammonium bicarbonate and the like; especially preferred is ammonium hydroxide.

Suitably, after washing the product is heated to a temperature of 150° C. or above as part of the purification processes to further remove fluorides. Suitable treating temperatures may be from 150° C. to 300° C. or so, optionally at lower than atmospheric pressure (taking care not to overheat the polymer), will further remove quench products of ammonium hydroxide while removing oligomers. Suitable combination of temperature and pressure can be readily estimated by a person skilled in the art on the basis of the known value of sublimation temperature of ammonium tetrafluoroborate which is 210° C. or so at 1 atm. A particularly preferred range is from 200° C. to 250° C. A suitable post-reactor purification methodology is illustrated in connection with FIG. 3.

Figure 3:
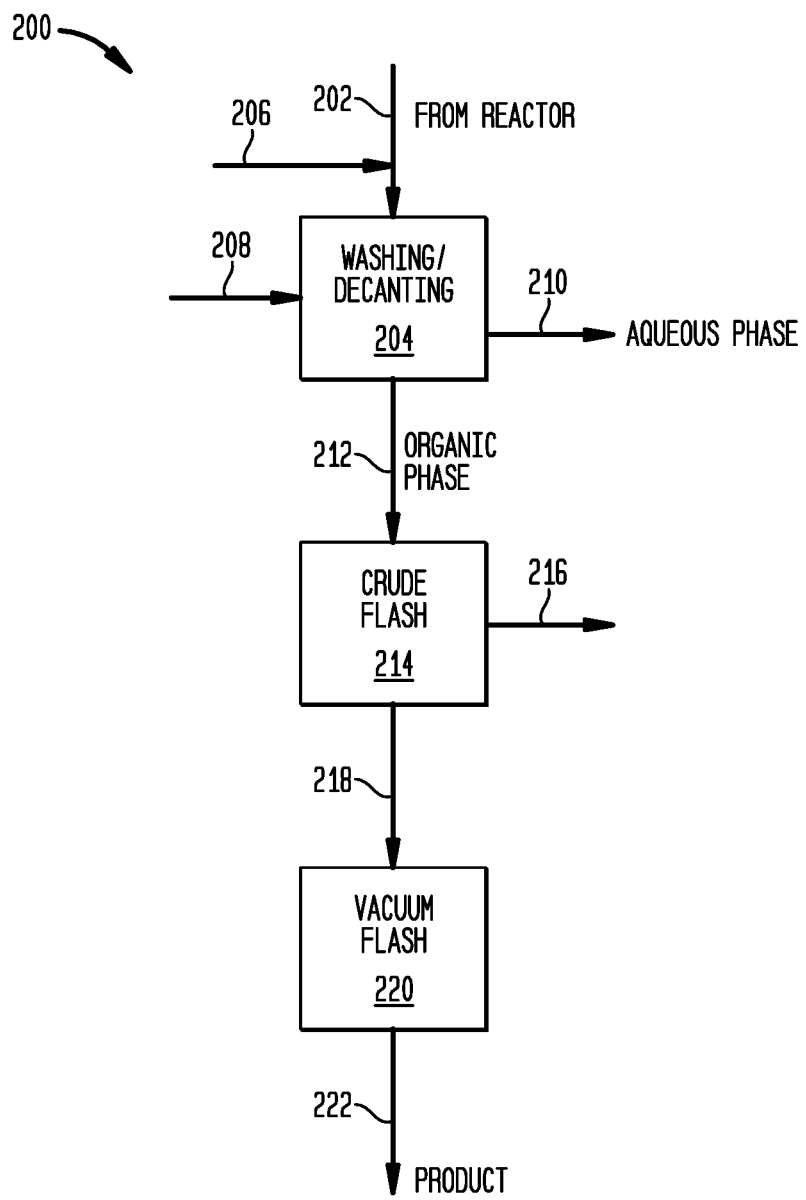
FIG. 3 is a block diagram illustrating a wash and distillation system for purifying PIB product.

In FIG. 3 there is illustrated schematically a process and apparatus 200 for purifying PIB produced in reactors such as reactors 12, 120 described above. The reactor outlet (for example, outlet 18 or outlet 130) feeds line 202 which is connected to a washing and decanting system 204. Line 206 provides a quenching agent such as aqueous ammonium hydroxide in excess of the amount needed to quench the catalyst. At 204, the quenched mixture is washed with water provided by way of line 208 and separated into two phases, an aqueous phase containing catalyst reside and ammonium hydroxide and a hydrocarbon phase containing polymer, unreacted monomer and solvents. The aqueous phase exits 204 via line 210 for further processing and recycle, while the organic phase exits 204 via line 212 and is heated and flashed at 214 under positive pressure at temperatures of 120-200° C. to remove monomer and light oligomers, usually up to C12 oligomers which exit via line 216 for further processing.

The partially purified PIB is forwarded via line 218 to a vacuum flash or distillation unit 220, where the product is further purified by distillation to remove oligomers, especially C8 to C24 oligomers at temperatures of from 150° C.-300° C. and pressures of from 0.25 psia to 10 psia or so. Alternatively, a wipe film evaporator or like apparatus can be employed to eliminate oligomers from the composition. The purified PIB product is removed at 222.

Example 1

High purity isobutylene feedstock having the composition of Table 2 is blended in a 1:1 weight ratio with the isobutylene dehydro effluent feedstock of Table 3. Blending is carried out using a mixer having generally the characteristics of the CSTR of FIG. 2, but it is appreciated that any mixing technique which provides a uniform mixture will be suitable as is in situ mixing in the reactor. The blended feedstock is fed to the reactor of FIG. 1 and is polymerized in the liquid phase at a temperature of −5° C. and an average residence time of less than 30 minutes. $BF_3$ and methanol catalyst modifier are provided in a methanol:$BF_3$ ratio of 1.6:1. 1 millimole $BF_3$ is used per mole of isobutylene introduced into the reactor. The crude product has a residual fluoride content of less than 200 ppm F by weight. Following withdrawal from the reactor, the reaction mixture is quenched to deactivate the catalyst, washed with water to remove salts and distilled to remove oligomers as discussed in connection with FIG. 3. The purified product has a total fluoride content of less than 10 ppm by weight fluoride, a molecular weight, Mn of 2100 Daltons and an alpha content of 79 mol. %.

Example 2

Isobutylene feedstock having the composition of Table 2 is blended in a 1:1 weight ratio with the isobutylene raffinate-1 feedstock of Table 4. The blend is fed to the reactor and is polymerized in the liquid phase utilizing the apparatus shown in FIG. 1 at a temperature of 10° C. and an average residence time of about 10 minutes. $BF_3$ and isopropanol catalyst modifier are provided in a isopropanol:$BF_3$ ratio of 1.8:1. 1 millimole $BF_3$ is used per mole of isobutylene introduced into the reactor. The crude product has a residual fluoride content of less than 200 ppm F by weight. Following withdrawal from the reactor, the reaction mixture is quenched to deactivate the catalyst, washed with water to remove salts and distilled to remove oligomers as discussed in connection with FIG. 3. The purified product has a total fluoride content of less than 8 ppm by weight fluoride, a molecular weight, Mn of 1050 Daltons and an alpha content of 83 mol. %.

Examples 3-6

These examples illustrate the surprising and profound effect of LB/IsoB index on the fluoride ride content of purified PIB polymer recovered from a reactor under a given set of conditions.

Isobutylene feedstock was fed to the reactor and was polymerized in the liquid phase utilizing the apparatus shown in FIG. 1 and the feed and process features shown in Table 6. Following withdrawal from the reactor, the reaction mixture was quenched to deactivate the catalyst, washed with water to remove salts and distilled to remove oligomers as discussed in connection with FIG. 3. Examples 3-6 had a molecular weight, Mn of about 1050 Daltons. Product 1, Examples 3, 4 (higher modifier/BF$_3$ ratio) had an alpha content of about 85 mol. %, while Product 2, Examples 5, 6 had an alpha content of less than 75 mol. % and greater than 50 mol. %.

The purified products had a fluoride content as indicated in Table 6, wherein it is seen that the fluoride content of the purified products correlated closely with the LB/IsoB index of the feedstock.

TABLE 6

Effect of LB/IsoB Index on Fluoride Content at a given set of Conditions

| Feature: | Units; LB/IsoB Index | Product 1 | Product 2 |
|---|---|---|---|
| Isobutane Content of feed | Wt. % from GC | 10 | 4 |
| Reaction temp | ° C. | 20 | 30 |
| Residence Time | min | <10 | <15 |
| alcohols:BF$_3$ ratio | molar ratio | 1.8 | 1.0 |
| Reactor Pressure | (psig) | 140 | 140 |
| PPM Fluoride (total in Final Product) at Given LB/IsoB Index | LB/IsoB = 0.30% | 1 | 1 |
| | LB/IsoB = 2.94% | 4 | 4 |

Comparative Example 1

This Example appears as Example 1 of Publication WO 2015/030489 and illustrates the effects of feed quality, residence time and temperature on fluoride content. A raffinate-1 feed was polymerized in a reactor with a BF$_3$/isopropanol catalyst and polymerized at a temperature of −29° C. for an average residence time of 45 minutes. The crude polymer product had a fluorine content of 299 ppm.

Comparative Example 2

This Example appears as Example 1 of U.S. Pat. No. 5,962,604 to Rath and illustrates the effect of temperature and feed quality on fluoride content. Isobutylene in a steam cracker refined feedstock was polymerized in a homogeneous reactor at a temperature of −13° C. over approximately 14 minutes residence time. The PIB product had an alpha content of 90 mol % and a molecular weight, Mn, of 1005. Fluorine content after extraction was 114 ppm and fluorine content after distillation was 65 ppm.

Example 7

This Example illustrates the removal of oligomers from the PIB product and the surprisingly low fluoride content of the product following ammonium hydroxide quench followed by distillation under vacuum 2 psia at elevated temperature, 220° C.

Following generally the procedure according to Example 1, a crude PIB product was produced and fed to the purification process of FIG. 3 and purified as described above. The product had low oligomer content and surprising low residual fluoride content as is seen in Table 7 and below. Without intending to be bound by any particular theory, the low oligomer content and sublimation of residual fluoride ammonium salts are believed to contribute substantially to the low residual fluoride content of the product.

TABLE 7

Purified PIB Composition After Vacuum Distillation

| Component | Wt. % |
|---|---|
| Main Polymer | 92.61% |
| C32 | 2.33% |
| C28 | 2.07% |
| C24 | 1.56% |
| C20 | 0.96% |
| C16 | 0.41% |
| C12 | 0.05% |
| Total Oligomer | 7.39% |

Residual fluoride content: 1-2 ppm by weight.

Embodiments of the Invention

There is thus provided in Embodiment No. 1 a method of making a low-fluoride reactive PIB composition comprising (a) providing an isobutylene-enriched C4 feedstock by way of blending a first mixed C4 feedstock with a second feedstock having a lower LB/IsoB index; (b) feeding the isobutylene-enriched C4 feedstock to a polymerization reactor with a catalyst complex comprising BF$_3$ and a modifier selected from alcohols, ethers and mixtures thereof; (c) polymerizing the isobutylene-enriched C4 feedstock in the reactor while maintaining the reactor at a temperature above −40° C. and utilizing a residence time less than 45 minutes to produce a crude PIB composition in a polymerization mixture; and (d) recovering a purified PIB composition from the polymerization mixture having a molecular weight, Mn, from 250 to 5000 Daltons, and an alpha vinylidene content of at least 50 mol %. In preferred implementations of Embodiment Nos. 1 and 11, the reactor is maintained at a temperature of greater than −30° C., greater than −25° C., greater than −20° C., or greater than −15° C. in each instance.

Embodiment No. 2 is a method according to Embodiment No. 1, wherein the first mixed C4 feedstock has an LB/IsoB index of greater than 3%.

Embodiment No. 3 is a method according to any of the foregoing Embodiment Nos. 1 or 2, wherein the first mixed C4 feedstock has an LB/IsoB index of greater than 4.5%.

Embodiment No. 4 is a method according to any of the foregoing Embodiments, wherein the first mixed C4 feedstock has an LB/IsoB index of greater than 10%.

Embodiment No. 5 is a method according to any of the foregoing Embodiments, wherein the first mixed C4 feedstock has an LB/IsoB index of greater than 25%.

Embodiment No. 6 is a method according to any of the foregoing Embodiments, wherein the first mixed C4 feedstock has an LB/IsoB index of greater than 40%.

Embodiment No. 7 is a method according to any of the foregoing Embodiments, wherein the first mixed C4 feedstock comprises raffinate or dehydro effluent.

Embodiment No. 8 is a method according to any of the foregoing Embodiments, wherein the second feedstock has an LB/IsoB index of less than 3%.

Embodiment No. 9 is a method according to any of the foregoing Embodiments, wherein the second feedstock has an LB/IsoB index of less than 1%.

Embodiment No. 10 is a method according to any of the foregoing Embodiments, wherein the second feedstock comprises isobutylene concentrate or highly purified isobutylene.

Embodiment No. 11 is a method of making a low-fluoride reactive PIB composition comprising: (a) providing an isobutylene-containing feedstock; (b) feeding the isobutylene-containing feedstock to a polymerization reactor with a catalyst complex comprising $BF_3$ and a modifier selected from alcohols, ethers and mixtures thereof; (c) polymerizing the isobutylene-enriched C4 feedstock in the reactor while maintaining the reactor at a temperature above −40° C. and utilizing a residence time less than 45 minutes to produce a crude PIB composition in a polymerization mixture; (d) withdrawing the crude PIB composition from the reactor; (e) neutralizing the crude PIB composition with an ammonium salt; (f) treating the crude PIB composition at a temperature of from 150° C. to 300° C. to separate oligomers from the crude PIB composition; and (g) recovering a purified PIB composition from the polymerization mixture having a molecular weight, Mn, from 250 to 5000 Daltons, and an alpha vinylidene content of at least 50 mol %.

Embodiment No. 12 is a method according to any of the foregoing Embodiments, further comprising washing the neutralized crude PIB composition with water and decanting the washed PIB composition to provide an aqueous phase and an organic phase containing PIB polymer.

Embodiment No. 13 is a method according to Embodiment No. 12, comprising treating the organic phase containing PIB polymer at a temperature of from 150° C. to 300° C. and a pressure of from 0.25 psia to 10 psia to remove PIB oligomers from the composition.

Embodiment No. 14 is a method according to Embodiment No. 13, comprising treating the organic phase containing PIB polymer at a temperature of from 200° C. to 250° C. and a pressure of from 0.5 psia to 5 psia to remove PIB oligomers from the composition.

Embodiment No. 15 is a method according to any of the foregoing Embodiments, wherein the residual fluoride content of the crude PIB composition is less than 200 ppm.

Embodiment No. 16 is a method according to any of the foregoing Embodiments, wherein the residual fluoride content of the crude PIB composition is less than 100 ppm.

Embodiment No. 17 is a method according to any of the foregoing Embodiments, wherein the residual fluoride content of the crude PIB composition is less than 50 ppm.

Embodiment No. 18 is a method according to Embodiment No. 17, wherein the residual fluoride content of the purified PIB composition is less than 50 ppm, preferably less than 25 ppm.

Embodiment No. 19 is a method according to Embodiment No. 18, wherein the residual fluoride content of the purified PIB composition is less than 20 ppm.

Embodiment No. 20 is a method according to Embodiment No. 19, wherein the residual fluoride content of the purified PIB composition is less than 15 ppm.

Embodiment No. 21 is a method according to Embodiment No. 20, wherein the residual fluoride content of the purified PIB composition is less than 10 ppm.

Embodiment No. 22 is a method according to Embodiment No. 21, wherein the residual fluoride content of the purified PIB composition is less than 5 ppm.

Embodiment No. 23 is a method according to Embodiment No. 22, wherein the residual fluoride content of the purified PIB composition is less than 3 ppm.

Embodiment No. 23a is a method according to Embodiment No. 23, wherein the residual fluoride content of the purified PIB composition is 2 ppm or less.

Embodiment No. 24 is a method according to any of Embodiment Nos. 1 to 17, wherein the residual organic fluoride content of the purified PIB composition is less than 40 ppm.

Embodiment No. 25 is a method according to Embodiment No. 24, wherein the residual organic fluoride content of the purified PIB composition is less than 25 ppm.

Embodiment No. 26 is a method according to Embodiment No. 25, wherein the residual organic fluoride content of the purified PIB composition is less than 20 ppm.

Embodiment No. 27 is a method according to Embodiment No. 26, wherein the residual organic fluoride content of the purified PIB composition is less than 10 ppm.

Embodiment No. 28 is a method according to Embodiment No. 27, wherein the residual organic fluoride content of the purified PIB composition is less than 5 ppm.

Embodiment No. 29 is a method according to Embodiment No. 28, wherein the residual organic fluoride content of the purified PIB composition is less than 3 ppm.

Embodiment No. 29a is a method according to Embodiment No. 29, wherein the residual organic fluoride content of the purified PIB composition is 2 ppm or less.

Embodiment No. 40 is a method according to Embodiment No. 17, wherein the residual organic fluoride content of the purified PIB composition contains less than 40 ppm by weight fluorine in the product corresponding to fluorinated compounds of the formula:

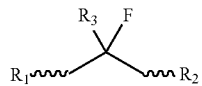

$R_1$ and $R_2 = C_n H_{2n+1}$
where n = 0 to 50
$R_3$ = H or —$CH_3$

Embodiment No. 31 is a method according to Embodiment No. 30, wherein the residual organic fluoride content of the purified PIB composition contains less than 25 ppm by weight fluorine in the product corresponding to fluorinated compounds of the formula:

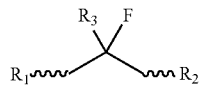

$R_1$ and $R_2 = C_n H_{2n+1}$
where n = 0 to 50
$R_3$ = H or —$CH_3$

Embodiment No. 32 is a method according to Embodiment No. 31, wherein the residual organic fluoride content of the purified PIB composition contains less than 20 ppm by weight fluorine in the product corresponding to fluorinated compounds of the formula:

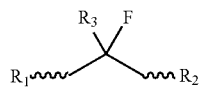

$R_1$ and $R_2 = C_n H_{2n+1}$
where n = 0 to 50
$R_3$ = H or —$CH_3$

Embodiment No. 33 is a method according to Embodiment No. 32, wherein the residual organic fluoride content of the purified PIB composition contains less than 10 ppm by weight fluorine in the product corresponding to fluorinated compounds of the formula:

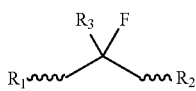

$R_1$ and $R_2 = C_n H_{2n+1}$
where n = 0 to 50
$R_3$ = H or ——$CH_3$

Embodiment No. 34 is a method according to Embodiment No. 33, wherein the residual organic fluoride content of the purified PIB composition contains less than 5 ppm by weight fluorine in the product corresponding to fluorinated compounds of the formula:

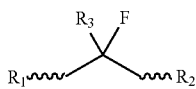

$R_1$ and $R_2 = C_n H_{2n+1}$
where n = 0 to 50
$R_3$ = H or ——$CH_3$

Embodiment No. 35 is a method according to Embodiment No. 34, wherein the residual organic fluoride content of the purified PIB composition contains less than 3 ppm by weight fluorine in the product corresponding to fluorinated compounds of the formula:

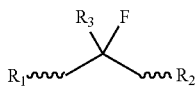

$R_1$ and $R_2 = C_n H_{2n+1}$
where n = 0 to 50
$R_3$ = H or ——$CH_3$

Embodiment No. 36 is a method according to any of the foregoing Embodiments, wherein the reactor is maintained at a temperature of −10° C. or above.

Embodiment No. 37 is a method according to any of the foregoing Embodiments, wherein the reactor is maintained at a temperature of −5° C. or above.

Embodiment No. 38 is a method according to any of the foregoing Embodiments, wherein the reactor is maintained at a temperature of 0° C. or above.

Embodiment No. 39 is a method according to any of the foregoing Embodiments, wherein the reactor is maintained at a temperature of 10° C. or above.

Embodiment No. 40 is a method according to any of the foregoing Embodiments, wherein the reactor is maintained at a temperature of 20° C. or above.

Embodiment No. 41 is a method according to any of the foregoing Embodiments, wherein the temperature is maintained at a temperature of from 0° C. to 50° C.

Embodiment No. 42 is a method according to any of the foregoing Embodiments, wherein the residence time is 30 minutes or less.

Embodiment No. 43 is a method according to any of the foregoing Embodiments, wherein the residence time is 20 minutes or less.

Embodiment No. 44 is a method according to any of the foregoing Embodiments, wherein the residence time is 15 minutes or less.

Embodiment No. 45 is a method according to any of the foregoing Embodiments, wherein the residence time is 10 minutes or less.

Embodiment No. 46 is a method according to any of the foregoing Embodiments, wherein the residence time is 7.5 minutes or less.

Embodiment No. 47 is a method according to any of the foregoing Embodiments, wherein the reactor is a loop reactor.

Embodiment No. 48 is a method according to any of the foregoing Embodiments, wherein, wherein the reactor is a continuous stirred tank reactor (CSTR).

Embodiment No. 49 is a method according to any of the foregoing Embodiments, wherein the reactor is operated with a catalyst turnover number of from 750 to 3500 lbs. polymer/lb $BF_3$.

Embodiment No. 50 is a method according to Embodiment No. 49, wherein the reactor is operated with a catalyst turnover number of at least 1000 lbs polymer/lb $BF_3$.

Embodiment No. 51 is a method according to Embodiment No. 49, wherein the reactor is operated with a catalyst turnover number of at least 1250 lbs polymer/lb $BF_3$.

Embodiment No. 52 is a method according to Embodiment No. 49, wherein the reactor is operated with a catalyst turnover number of at least 2000 lbs polymer/lb $BF_3$.

Embodiment No. 53 is a method according to any one of Embodiment Nos. 1 to 46, wherein the reactor is a fixed bed reactor.

Embodiment No. 54 is a method according to any of the foregoing Embodiments, wherein the modifier comprises a mixture of alcohol and ether.

Embodiment No. 55 is a method according to any of the foregoing Embodiments, wherein the catalyst complex comprises a modifier selected from methanol, ethanol, tertiary butanol, isopropyl ether, diethyl ether and mixtures thereof.

Embodiment No. 56 is a method according to Embodiment No. 55, wherein the modifier consists of methanol.

Embodiment No. 57 is a method according to Embodiment No. 55, wherein the modifier comprises at least one of isopropyl ether or diethyl ether.

Embodiment No. 58 is a method according to any of the foregoing Embodiments, wherein the molar ratio of modifier to $BF_3$ is in the range of 0.5:1 to 3.5:1.

Embodiment No. 59 is a method according to any of the foregoing Embodiments, wherein the molar ratio of modifier to $BF_3$ is in the range of 0.5:1 to 3:1.

Embodiment No. 60 is a method according to any of the foregoing Embodiments, wherein the molar ratio of modifier to $BF_3$ is in the range of 0.5:1 to 2:1.

Embodiment No. 61 is a method according to any of the foregoing Embodiments, wherein the molar ratio of modifier to $BF_3$ is in the range of 1:1 to 1.8:1.

Embodiment No. 62 is a method according to any of the foregoing Embodiments, wherein the modifier comprises a mixture of an alcohol and an ether wherein the molar ratio of alcohol to $BF_3$ is from 0-2:1 and the molar ratio of ether to $BF_3$ is from 0-3:1.

Embodiment No. 63 is a method according to any of the foregoing Embodiments, wherein the purified PIB composition has an alpha vinylidene content of at least 60 mole %.

Embodiment No. 64 is a method according to any of the foregoing Embodiments, wherein the purified PIB composition has an alpha vinylidene content of at least 70 mole %.

Embodiment No. 65 is a method according to any of the foregoing Embodiments, wherein the purified PIB composition has an alpha vinylidene content of at least 75 mole %.

Embodiment No. 66 is a method according to any of Embodiment Nos. 1 to 62, wherein the purified PIB composition is characterized in that a first portion of the PIB molecules have alpha position double bonds and a second portion of the molecules have beta position double bonds, wherein said first and second portions together include at least 80 mole % of the PIB molecules of the composition, wherein said first portion includes less than 75 mole % of the PIB molecules of the composition, and wherein no more than 10 mole % of the PIB molecules of the composition have tetra-substituted double bonds.

Embodiment No. 67 is a method according to any of the foregoing Embodiments, wherein the purified PIB composition includes from 0.05 mole % to 5 mole % of molecules with internal vinylidene bonds.

Embodiment No. 68 is a method according to any of the foregoing Embodiments, wherein the molecular weight, Mn, of the purified PIB composition is from 300 to 5000 Daltons.

Embodiment No. 69 is a method according to any of the foregoing Embodiments, wherein the molecular weight, Mn, of the purified PIB composition is from 300 to 3500 Daltons.

Embodiment No. 70 is a method according to any of the foregoing Embodiments, wherein the molecular weight, Mn, of the purified PIB composition is from 500 to 3000 Daltons.

Embodiment No. 71 is a method according to any of the foregoing Embodiments, wherein the molecular weight, MW, of the purified PIB composition is from 750 to 1500 Daltons.

Embodiment No. 72 is a method according to any of the foregoing Embodiments, wherein the purified PIB composition has a polydispersity index (PDI) of less than 2.5.

Embodiment No. 73 is a method according to any of the foregoing Embodiments, wherein the purified PIB composition has a polydispersity index (PDI) of less than 2.

Embodiment No. 74 is a method according to any of the foregoing Embodiments, wherein the purified PIB composition has a polydispersity index (PDI) of no more than 1.5.

Embodiment No. 75 is the method according to any of the foregoing Embodiments, wherein the process further comprises quenching the reaction using ammonium hydroxide.

Embodiment No. 76 is the method according to Embodiments No. 75, wherein salts of the quenched product include ammonium tetrafluoroborate which is removed from the PIB at temperature above 150° C. and at reduced pressure, below 15 psia.

Embodiment No. 77 is a method according to any of Embodiment Nos. 1 to 75, further comprising treating the crude PIB composition at a temperature of from 150° C. to 300° C. to separate oligomers from the crude composition to produce the purified PIB composition.

Embodiment No. 78 is a method according to any of the foregoing Embodiments, wherein the purified PIB composition has less than 10% by weight C8 to C24 oligomers.

Embodiment No. 79 is a method according to any of the foregoing Embodiments, wherein the purified PIB composition has less than 5% by weight C8 to C24 oligomers.

Embodiment No. 80 is a method according to any of the foregoing Embodiments, wherein the purified PIB composition has less than 3% by weight C8 to C24 oligomers.

In any of the foregoing embodiments, it is preferred in general that no more than 15 mole % of the PIB molecules of the composition has tetra-substituted double bonds. More preferably in all cases, less than 10 mole % of the PIB molecules of the composition have tetra-substituted double bonds and still more preferably in all of the foregoing embodiments, no more than 5 mole % of the PIB molecules of the composition have tetra-substituted double bonds.

While the invention has been described in detail, modifications within the spirit and scope of the invention will be readily apparent to those of skill in the art. Such modifications are also to be considered as part of the present invention. In view of the foregoing discussion, relevant knowledge in the art and references discussed above in connection with the Background of the Invention, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of illustration only and is not intended to limit the invention.

What is claimed is:

1. A method of making a low-fluoride reactive PIB composition comprising:
   (a) providing an isobutylene-enriched C4 feedstock by way of blending a first mixed C4 feedstock having an LB/IsoB index of greater than 3% with a second feedstock having a lower LB/IsoB index, thereby upgrading the feed to the reactor to higher isobutylene content through blending;
   (b) feeding the isobutylene-enriched C4 feedstock to a polymerization reactor with a catalyst complex comprising $BF_3$ and a modifier selected from alcohols, ethers and mixtures thereof;
   (c) polymerizing the isobutylene-enriched C4 feedstock in the reactor while maintaining the reactor at a temperature above −40° C. and utilizing a residence time less than 45 minutes to produce a crude PIB composition in a polymerization mixture; and
   (d) recovering a purified PIB composition from the polymerization mixture having a molecular weight, Mn, from 250 to 5000 Daltons, and an alpha vinylidene content of at least 50 mol %.

2. The method according to claim 1, wherein the residual fluoride content of the purified PIB composition is less than 20 ppm.

3. The method according to claim 2, wherein the residual fluoride content of the purified PIB composition is less than 5 ppm.

4. The method according to claim 2, wherein the residual organic fluoride content of the purified PIB composition is less than 3 ppm.

5. The method according to claim 1, wherein the first mixed C4 feedstock has an LB/IsoB index of greater than 25% and wherein the second feedstock has an LB/IsoB index of less than 3%.

6. The method according to claim 1, wherein the first mixed C4 feedstock comprises raffinate or dehydro effluent.

7. The method according to claim 1, wherein the second feedstock comprises isobutylene concentrate or highly purified isobutylene.

8. The method according to claim 1, wherein the reactor is maintained at a temperature of −25° C. or above.

9. The method according to claim 1, wherein the reactor is maintained at a temperature of −15° C. or above.

10. The method according to claim 1, wherein the reactor is maintained at a temperature above 0° C.

11. The method according to claim 1, wherein the residence time is 20 minutes or less.

12. The method according to claim 11, wherein the residence time is 7.5 minutes or less.

13. The method according to claim 1, wherein the catalyst complex comprises a modifier selected from methanol, ethanol, tertiary butanol, isopropyl ether, diethyl ether and mixtures thereof.

14. The method according to claim 1, wherein the molar ratio of modifier to $BF_3$ is in the range of 1:1 to 1.8:1.

15. The method according to claim 1, wherein the molecular weight, Mn, of the purified PIB composition is from 300 to 5000 Daltons.

16. A method of making a low-fluoride reactive PIB composition comprising:
 (a) providing an isobutylene-containing feedstock;
 (b) feeding the isobutylene-containing feedstock to a polymerization reactor with a catalyst complex comprising $BF_3$ and a modifier selected from alcohols, ethers and mixtures thereof;
 (c) polymerizing the isobutylene-enriched C4 feedstock in the reactor while maintaining the reactor at a temperature above −40° C. and utilizing a residence time less than 45 minutes to produce a crude PIB composition in a polymerization mixture;
 (d) withdrawing the crude PIB composition from the reactor;
 (e) neutralizing the crude PIB composition with a quenching agent;
 (f) treating the crude PIB composition at a temperature of from 150° C. to 300° C. to separate oligomers from the crude PIB composition; and
 (g) recovering a purified PIB composition from the polymerization mixture having a molecular weight, Mn, from 250 to 5000 Daltons, and an alpha vinylidene content of at least 50 mol %,
further comprising washing the neutralized crude PIB composition with water and decanting the washed PIB composition to provide an aqueous phase and an organic phase containing PIB polymer and treating the organic phase containing PIB polymer at a temperature of from 150° C. to 300° C. and a pressure of from 0.25 psia to 10 psia to remove PIB oligomers from the composition.

17. The method according to claim 16, wherein the purified PIB composition has less than 10% by weight C8 to 24 oligomers.

18. The method according to claim 16, wherein the quenching agent is an ammonium quenching agent.

19. The method according to claim 16, wherein the quenching agent is ammonium hydroxide.

20. In a method of making a reactive PIB composition, the improvement comprising withdrawing a crude PIB composition from a reactor; neutralizing the crude PIB composition with an ammonium quenching agent; washing the neutralized crude PIB composition with water and decanting the washed PIB composition to provide an aqueous phase and an organic phase containing PIB polymer; and treating the organic phase containing PIB polymer at a temperature of from 150° C. to 300° C. and a pressure of from 0.25 psia to 10 psia to remove PIB oligomers from the composition.

21. The improvement according to claim 20, comprising treating the organic phase containing PIB polymer at a temperature of from 200° C. to 250° C. and a pressure of from 0.5 psia to 5 psia to remove PIB oligomers from the composition.

* * * * *